UNITED STATES PATENT OFFICE.

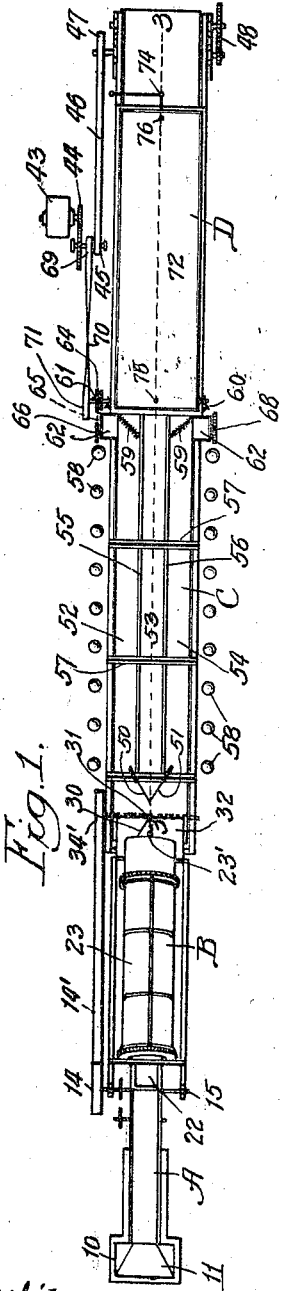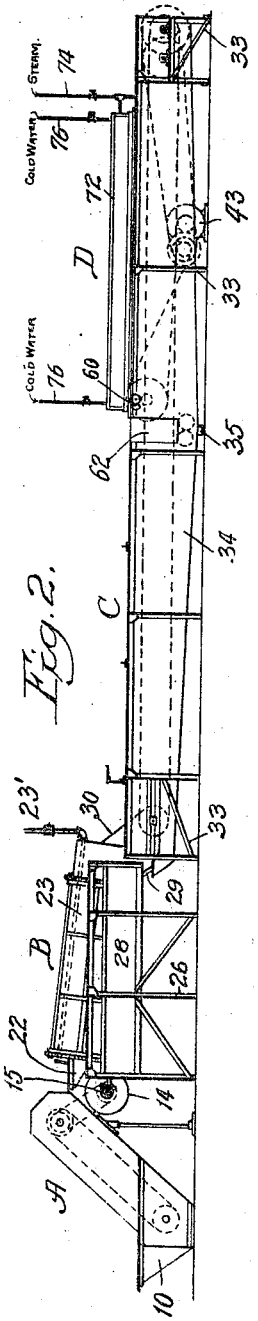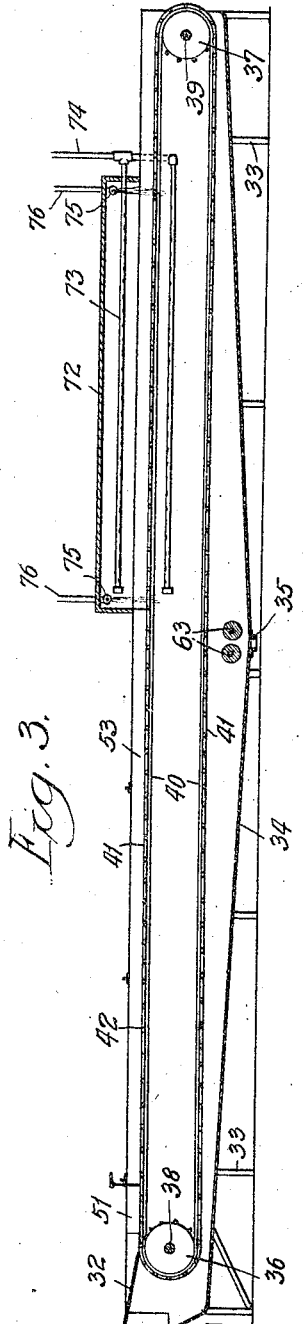

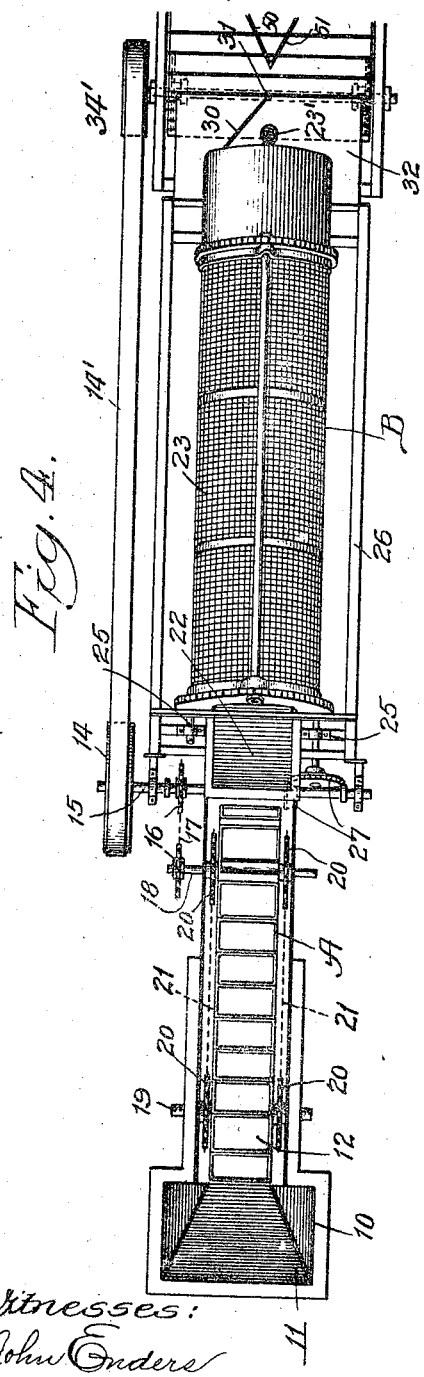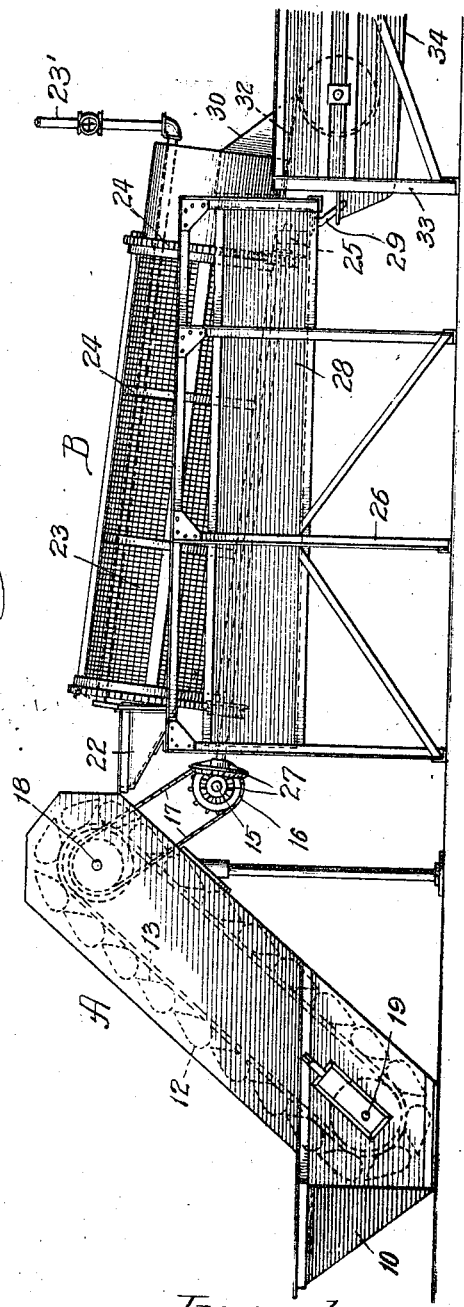

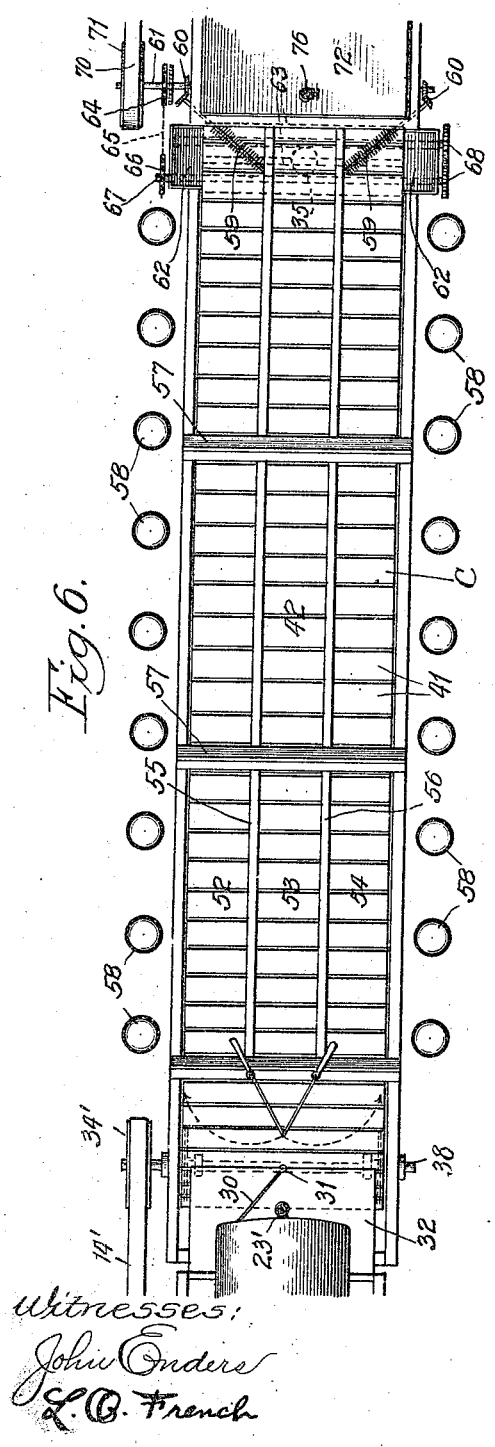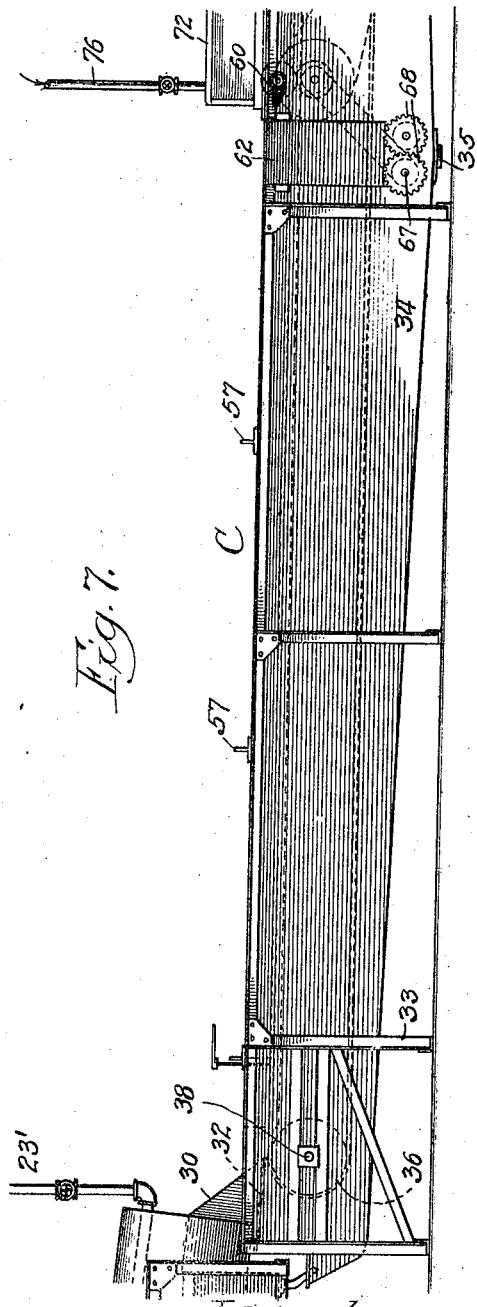

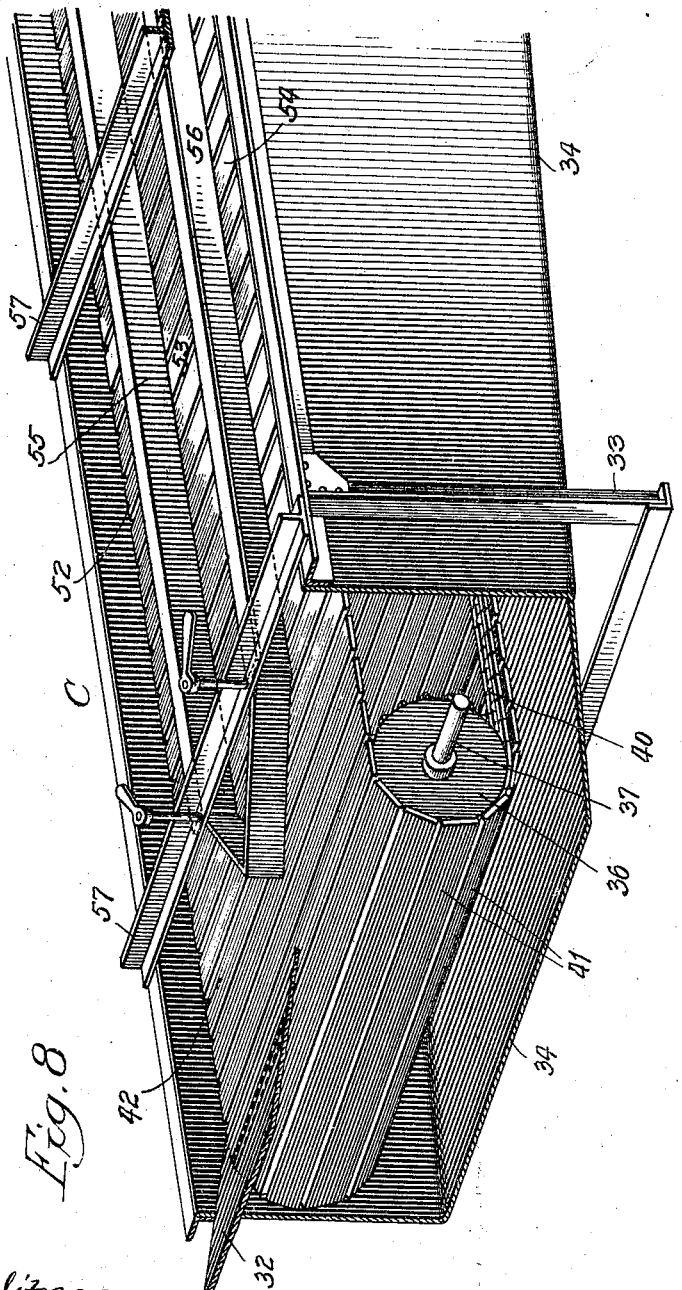

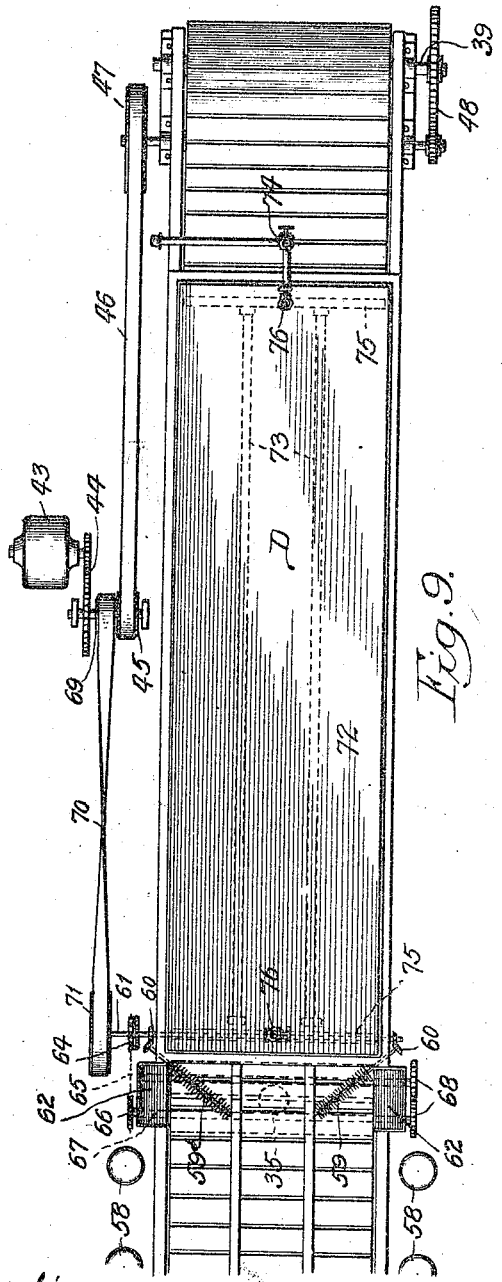
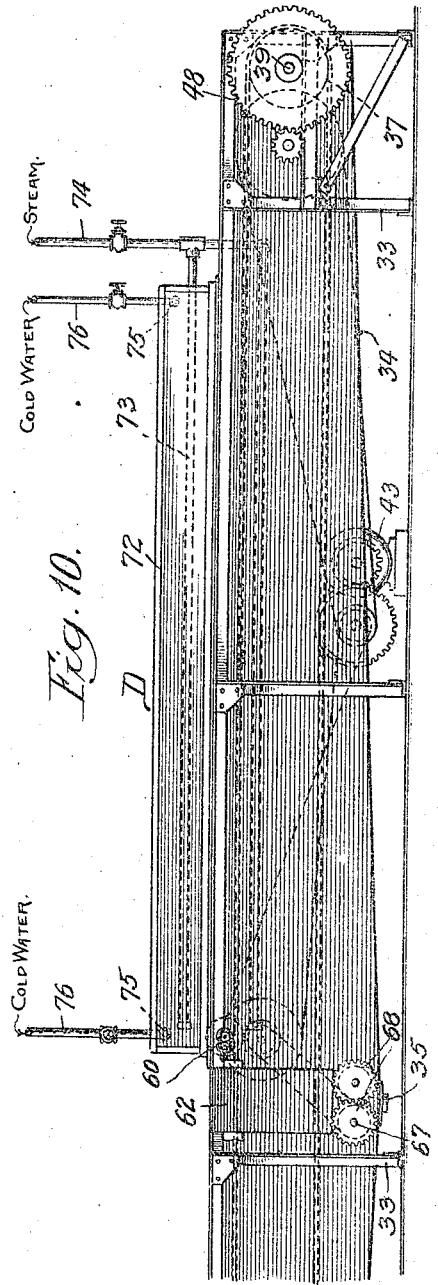

CHARLES J. PETERSON, OF WILMETTE, ILLINOIS, ASSIGNOR TO WELLER MANUFACTURING COMPANY, OF CHICAGO, ILLINOIS, A CORPORATION OF ILLINOIS.

APPARATUS FOR PREPARING FRUITS AND VEGETABLES FOR PRESERVING.

1,180,877.  Specification of Letters Patent.  Patented Apr. 25, 1916.

Application filed January 14, 1914. Serial No. 811,963.

*To all whom it may concern:*

Be it known that I, CHARLES J. PETERSON, a resident of Wilmette, in the county of Cook and State of Illinois, have invented certain new and useful Improvements in Apparatus for Preparing Fruits and Vegetables for Preserving, of which the following is a full, clear, and exact description.

The invention relates to apparatus for preparing stock, such as fruits and vegetables for preserving.

The invention designs to provide an apparatus embodied in a coöperative unit for successively feeding, sorting and scalding the fruit or vegetables.

The invention further designs to provide an apparatus whereby the products to be treated are successively and continuously fed through the washing, sorting and scalding compartments.

The invention further designs to provide a single drain for the whole apparatus.

It has generally been the custom to construct sorting tables wherein the bad stock is picked out from the good during the progress of the stock along the table. This method is objectionable because at times, the operators at the sorting table do not pick out all the bad stock and fail to cut out all the bad portions from the good stock, and in consequence, some of the bad stock remains with the good and contaminates the whole of such stock. In the sorter herein shown and described, provision is made for sorting the good stock from the bad and only the good stock continues on to the scalder. Resultantly, contamination of this stock will not occur and the objectionable features of the old method is overcome by this new form of apparatus.

The invention further designs to provide a new and improved triple compartment sorting table whereby the good stock may be removed from the bad.

The invention further designs to provide a continuous traveling table for the sorter and scalder.

The invention further designs to provide means for disposing of the bad stock after it leaves the sorting table.

The invention further designs to provide a new and improved form of scalder whereby the steam contained therein is prevented from dissipating into the room to annoy the operators, by the use of a blanket for the steam in the form of a continuous sheet of cold water forming a curtain and an effective steam-tight closure at the ends of the scalder.

The invention further designs to provide a new and improved preserving apparatus.

The invention consists in the novel features hereinafter set forth and more particularly defined by claims at the conclusion hereof.

In the drawings: Figure 1 is a plan view of the apparatus. Fig. 2 is an elevation thereof. Fig. 3 is an enlarged longitudinal sectional view of the sorter and scalder taken on the line 3—3 of Fig. 1. Fig. 4 is an enlarged plan of the feeder and washer. Fig. 5 is an elevation thereof. Fig. 6 is an enlarged plan of the sorter. Fig. 7 is an elevation thereof. Fig. 8 is a sectional perspective view of the sorter. Fig. 9 is an enlarged plan of the scalder. Fig. 10 is an elevation thereof.

The invention comprises a feeder A, a washer B, a sorter C, a scalder D, and means for continuously feeding the stock through these units.

The apparatus illustrated as an exemplification of the invention, is particularly for stock, such as tomatoes.

The feeder comprises a water-tank 10, having a deflector plate 11 therein. The tomatoes are dumped into the tank 10 and initially soaked and then are forced into buckets 12, on the bucket conveyer 13 by the deflector plate 11. The buckets 12 are of the basket type with a long back which makes them continuous and forms a perfect discharge at the head or top of the conveyer or elevator A. The conveyer A is driven from the pulley 14 on the shaft 15 through sprockets 16 connected by a chain 17, to drive the shaft 18 which drives a similar shaft 19 through parallelly disposed sprockets 20, connected by chains 21. The initial soaking of the tomatoes when they are placed in the tank 10 tends to remove and loosen the dirt which adheres to them previous to their being raised by the conveyer A to the mouth of the washer B and prepares them for final washing. A hopper 22, disposed adjacent the discharge end of the conveyer A and the opening to the washer B, discharges tomatoes fed by the elevator into the washer.

The washer comprises a revolving screen 23 secured to a cylindrical frame 24 which is mounted on a double set of trunnions 25 which are supported on a suitable frame 26 and are driven through beveled gears 27, one of these gears being secured to the drive-shaft 15. Directly below, and partially inclosing the lower part of the revolving washer 23, is a drip-pan 28, provided with a discharge-opening 29, so that the water from the conveyer A and the washer will drain from the drip-pan 28 into the drip-pan hereinafter described provided for the sorter and scalder. The tomatoes are carried along in an even manner through the revolving screen 23 and are washed by a continuous spray of water under high pressure from a spray pipe 23' which is disposed in the upper portion of the washers. From the washer, the tomatoes pass to the sorter C and are directed onto this device by an adjustable plate 30 pivoted at 31 to a delivery chute 32, so that the tomatoes issuing from the washer will be delivered directly to the movable table on the sorter and so that the feeding of the material from the washer may be accomplished continuously and as evenly as possible.

The combined sorter and scalder comprises a suitable frame 33 and a drip-pan 34, extending along the length of both the sorter and scalder and inclosing therein all parts of the same, so that the water from the tomatoes and from the apparatus itself will be conducted by the inclined drip-pan 34 to a single drain 35, and whereby the water from the washer B, which drains from the tank 28 through the discharge 29 into the drip-pan 34, will also be carried off by said pan so that a continuous system of draining, having a single outlet is provided for the system.

Sprockets 36 and 37 are mounted on shafts 38 and 39, respectively, which are journaled in the frame 33. These sprockets carry endless chains 40 to which are secured a series of steel plates 41 spaced apart from each other so as to allow them to drain, and forming an endless conveyer table 42 to convey stock from the washer B through the sorter C and the scalder D. The conveyer table 42 is driven by a motor 43 through a gear train 44, pulley 45, belts 46, pulley 47, and gear-train 48 to drive shaft 39 to drive the sprockets 37 which, in turn, will drive the chains 40 of the conveyer table 42. The pulley 14 is also driven by the motor 43 through the belt 14' and pulley 34' on the shaft carrying the sprockets 36. Thus, all the units of the apparatus will be driven simultaneously from the motor 43.

The end of the sorter C adjacent the washer B is provided with hinged deflector gates 50 and 51 pivotally secured to the frame 33 and which, when in position, divide the tomatoes issuing from washer B into two streams which move along conveyer table 42. The sorter is divided into three compartments 52, 53, 54, which are separated from each other by partitions 55 and 56 running lengthwise of the sorter and secured at the top to cross braces 57 on frame 33 and extending downwardly to the surface of the conveyer table 42, whereby stock carried by the conveyer table 42 will pass along within these compartments and whereby stock from one of the compartments may be separated from that in the same and placed in another.

In practice, the tomatoes which have issued from the washer B and have been conveyed to the conveyer table 42, are divided by the deflector plates 50 and 51 into two streams, moving along in compartments 52 and 54. The sorters sit near the table on seats, such as shown at 58, and as the stock passes by them, they remove the good stock from the bad and place it in the central compartment 53 and also cut out the bad portions from such of the good stock as can be saved, and which is then placed in compartment 53, so that when the stock has moved to the farther end of the table, all the good stock has been removed from the bad stock and only the good stock is retained in the central compartment 53.

Mechanism is provided at the exit end of the sorter for disposing of the bad stock, which consists of a pair of revolving brushes 59 driven through bevel gears 60 on a drive-shaft 61 and oppositely disposed hoppers 62 adjacent compartments 52 and 54 so that material traveling along in said compartments will be deflected by the revolving brushes into said hoppers which are provided at their lower ends with a pair of crushers 63 for crushing the material so that it will be readily carried off through the drain 35. The crushers are driven from the drive-shaft 61 through the sprocket 64, chain 65 to sprocket 66, which is mounted on a shaft 67 which drives the gears 68 for the revolving crusher rolls 63. The shaft 61 is driven by the motor 43 through the gear train 44, pulley 69, belt 70 and pulley 71 on said drive-shaft 61.

As previously stated, the bad stock in the compartments 52 and 54 is disposed of and only the good stock is allowed to continue on to the scalder D, and is carried therethrough on the conveyer 42. The scalder D comprises a hood 72 in which are located steam pipes 73 connected to a steam supply through a pipe 74. At either end of the scalder and within said hood there are transversely disposed spray tubes 75 connected to a supply of cold water through pipes 76. The conveyer table 42 and drip-pan 33 form a part of the scalder, as previously described.

The stock or the tomatoes issuing from the compartment 53 are carried along through the scalder D and are scalded by the steam issuing from openings in the pipes 73. The cold water from the spray pipes disposed at either end of the scalder serves as a blanket or curtain for the steam contained within the scalder, so that during its operation, the steam will be prevented from dissipating into the room to annoy the operators.

The invention thus exemplifies a combined feeding, washing, sorting and scalding apparatus which is used in the process of preserving fruits and vegetables and one in which the stock to be treated is continuously fed through the various units, the drainage for these units being carried off by a single drain.

The invention also exemplifies a triple compartment sorting table, wherein the good stock is separated from the bad and the bad stock disposed of without handling the same, and whereby only the good stock is allowed to continue on through the scalder which is provided with a steam-tight closure at either end.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. Apparatus of the character described, comprising the combination of a sorter and a scalder, means for continuously feeding material through the sorter and scalder and a drip-pan for receiving the drippings from the sorter and the scalder and conducting them into a single drain.

2. Apparatus of the character described, comprising the combination of a washer, a sorter, a scalder, means for continuously feeding material through the washer, sorter and scalder, and a drip-pan for receiving the drippings from the washer, the sorter and scalder and conducting them to a single drain.

3. Apparatus of the character described, comprising the combination of a sorter, comprising a sorting table, a scalder and means for conducting the residue from said sorter and scalder to a single drain.

4. Apparatus of the character described, comprising the combination of a sorting table, means for feeding the stock continuously along the table, a scalder through which the stock is conducted, and means for removing the bad stock from the table before it reaches the scalder.

5. In apparatus of the character described, the combination of a sorting table, comprising plural compartments, means for delivering the unsorted stock into one of the compartments, means for delivering all of the stock left in said compartment to waste, a scalder, and means for delivering all the stock placed in the other compartment to the scalder.

6. In apparatus of the character described, the combination of a sorter, comprising a triple compartment sorting table, whereby the good stock may be separated from the bad and placed in one of said compartments, a scalder comprising a scalding table and means comprising an endless apron for conveying the stock along the sorting table and the good stock along the scalding table.

7. In apparatus of the character described, the combination of a sorter comprising a triple-compartment sorting table whereby the good stock may be separated from the bad and placed in one of said compartments, means for removing the bad stock from the table, a scalder comprising a scalding table and common means for conveying the stock along the sorting table and the good stock along the scalding table.

8. In apparatus of the character described, the combination of a sorter comprising a triple compartment sorting table whereby the good stock may be separated from the bad and placed in one of said compartments, means for removing the bad stock from the other compartments, a scalder comprising a scalding table and means comprising an endless apron for conveying the stock along the sorting table and the good stock along the scalding table.

9. Apparatus of the character described, comprising the combination of a sorter and a scalder, means for preventing steam escaping from said scalder toward the sorter, and means for continuously feeding the material through said sorter and scalder.

10. In apparatus of the character described, the combination of a sorter and a scalder, means comprising a cold water spray pipe at one end of the scalder for preventing steam escaping from said scalder toward the sorter and means for feeding the material through said sorter and scalder.

CHARLES J. PETERSON.

Witnesses:
MILDRED STUMPF,
KATHARINE GERLACH.